(12) United States Patent
Lefavour et al.

(10) Patent No.: US 7,066,003 B2
(45) Date of Patent: Jun. 27, 2006

(54) HYDRAULIC TOOL WITH RAPID RAM ADVANCE

(75) Inventors: John D. Lefavour, Litchfield, NH (US); Armand T. Montminy, Manchester, NH (US); Thomas Faucher, Manchester, NH (US)

(73) Assignee: FCI Americas Technology, Inc., Reno, NV (US)

( * ) Notice: Subject to any disclaimer, the term of this patent is extended or adjusted under 35 U.S.C. 154(b) by 0 days.

(21) Appl. No.: 11/259,293

(22) Filed: Oct. 25, 2005

(65) Prior Publication Data

US 2006/0032285 A1    Feb. 16, 2006

Related U.S. Application Data

(63) Continuation of application No. 10/739,562, filed on Dec. 18, 2003, now Pat. No. 6,986,274.

(51) Int. Cl.
*B21J 9/18* (2006.01)

(52) U.S. Cl. ...................... 72/453.16; 60/481
(58) Field of Classification Search ............. 72/453.16; 60/481
See application file for complete search history.

(56) References Cited

U.S. PATENT DOCUMENTS

| 3,972,218 A | 8/1976 | Pawloski ............ 72/407 |
| 4,339,942 A | 7/1982 | Svensson ............ 72/453.16 |
| 5,778,755 A | 7/1998 | Boese ............ 91/399 |
| 5,979,215 A | 11/1999 | Lefavour et al. ....... 72/453.16 |
| 6,446,482 B1 * | 9/2002 | Heskey et al. ......... 72/453.16 |
| 6,564,610 B1 | 5/2003 | Lefavour et al. ....... 72/453.16 |

FOREIGN PATENT DOCUMENTS

WO    WO-03/089165 A1    10/2003

* cited by examiner

*Primary Examiner*—Derris H. Banks
*Assistant Examiner*—Debra Wolfe
(74) *Attorney, Agent, or Firm*—Harrington & Smith, LLP

(57) ABSTRACT

A hydraulic tool including a frame having a hydraulic conduit system; a ram movably connected to the frame; and a multi-speed ram advancement system for advancing the ram in at least two different rates of movement on the frame. The multi-speed ram advancement system includes a hydraulic pump connected to the hydraulic conduit system of the frame; and a conduit tube extending into a hydraulic chamber inside the ram and fixedly connected to the frame. The conduit tube is adapted to conduit hydraulic fluid from the hydraulic conduit system into the hydraulic chamber inside the ram. The conduit tube is axially rotatably connected to the frame and longitudinally stationarily fixed to the frame.

9 Claims, 7 Drawing Sheets

HYDRAULIC TOOL WITH RAPID RAM ADVANCE

CROSS REFERENCE TO RELATED APPLICATION

This is a continuation patent application of application Ser. No. 10/739,562, filed Dec. 18, 2003, now U.S. Pat. No. 6,986,274.

BACKGROUND OF THE INVENTION

1. Field of the Invention

The present invention relates to hydraulic tools and, more particularly, to a hydraulic tool with a multi-speed rapid ram advancement system.

2. Brief Description of Prior Developments

U.S. Pat. No. 4,339,942 discloses a hydraulically operated crimping tool. The tool has a hydraulic piston with a central recess that receives a member with a duct. A rear end of the member is screwed into the frame of the tool and is adapted to conduit oil into the central recess.

There is a desire to provide a hydraulic tool, such as a crimping tool or a cutting tool, which has a rapid ram advanced feature, but which can accommodate longer stroke lengths of the ram. Hydraulic tools, such as crimping tools and cutting tools, can comprise rotatable heads wherein the ram of the tool is adapted to rotate relative to the frame of the tool. With this type of rotatable head hydraulic tool, a conduit member such as described in U.S. Pat. No. 4,339,942 can cause problems because of the threaded engagement between the conduit member and the frame. This threaded engagement can loosen or become disconnected because of rotation of the rotatable head; transferred to the conduit member by friction between the ram and the conduit member. In addition, vibrations in a tool, such as a battery operated hydraulic tool, can also cause this threaded engagement to loosen or become disconnected. There is a desire to provide a tool which can accommodate longer stroke lengths of the ram, have a rotatable head and a conduit tube which extends into the ram, but with a system to prevent disconnection of the conduit tube from the frame which otherwise might occur with a threaded connection because of rotation of the head or vibrations in the tool. There is also a desire to provide a hydraulic tool with a conduit tube extending into a ram cavity wherein the conduit tube is easier to connect to a frame of the tool.

SUMMARY OF THE INVENTION

In accordance with one aspect of the present invention, a hydraulic tool is provided including a frame having a hydraulic conduit system; a ram movably connected to the frame; and a multi-speed ram advancement system for advancing the ram in at least two different rates of movement on the frame. The multi-speed ram advancement system includes a hydraulic pump connected to the hydraulic conduit system of the frame; and a conduit tube extending into a hydraulic chamber inside the ram and fixedly connected to the frame. The conduit tube is adapted to conduit hydraulic fluid from the hydraulic conduit system into the hydraulic chamber inside the ram. The conduit tube is axially rotatably connected to the frame and longitudinally stationarily fixed to the frame.

In accordance with another embodiment of the present invention, a hydraulic tool is provided comprising a frame having a hydraulic conduit system; a ram movably connected to the frame; and a multi-speed ram advancement system for advancing the ram in at least two different rates of movement on the frame. The multi-speed ram advancement system comprises a hydraulic pump connected to the hydraulic conduit system of the frame; and a conduit tube located in a hydraulic chamber inside the ram and fixedly connected to the frame. A rear end of the conduit tube comprises an angular groove with a pin extending from the frame into the annular groove to attach the conduit tube to the frame. The conduit tube is rotatable relative to the frame with the groove rotating on the pin. The pin substantially prevents the conduit tube from moving longitudinally relative to the frame.

In accordance with another aspect of the present invention, a hydraulic tool is provided comprising a frame having a hydraulic conduit system; a ram movably connected to the frame; and a multi-speed ram advancement system for advancing the ram in at least two different rates of movement on the frame. The multi-speed ram advancement system comprises a hydraulic pump connected to the hydraulic conduit system of the frame; and a conduit tube extending into a hydraulic chamber inside the ram and fixedly connected to the-frame. A rear end of the conduit tube comprises an angular groove with a pin extending from the frame into the annular groove to attach the conduit tube to the frame. The conduit tube is rotatable relative to the frame with the groove rotating on the pin. The pin substantially prevents the conduit tube from moving longitudinally relative to the frame. The conduit tube is adapted to conduit hydraulic fluid from the hydraulic conduit system into the hydraulic chamber inside the ram. The conduit tube is axially rotatably connected to the frame and longitudinally stationarily fixed to the frame.

In accordance with another aspect of the present invention, a hydraulic tool is provided comprising a frame having a hydraulic conduit system connected to a hydraulic fluid reservoir; a ram movably connected to the frame; a ram advancement system for advancing the ram on the frame, the ram advancement system comprising an activation trigger; and a combined activation trigger guard and hydraulic fluid release system comprising a valve and a member located a spaced distance in front of the activation trigger, wherein the member forms a trigger guard for the activation trigger, and wherein the member is adapted to actuate the valve to release hydraulic fluid back to the hydraulic fluid reservoir.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
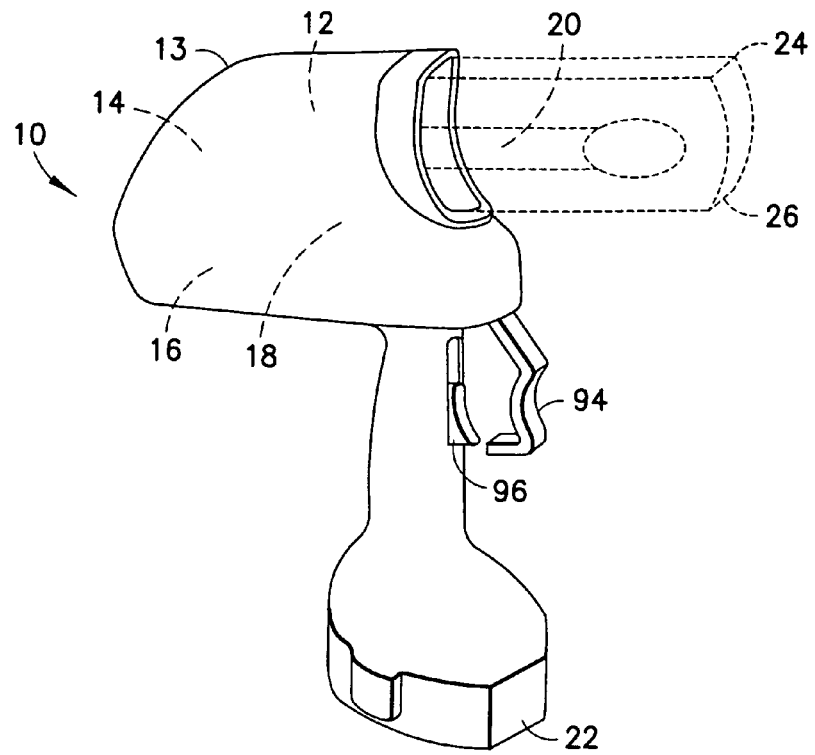
FIG. 1 is a perspective view of a tool incorporating features of the present invention.

Referring to FIG. 1, there is shown a perspective view of a hydraulic tool 10 incorporating features of the present invention. Although the present invention will be described with reference to the exemplary embodiment shown in the drawings, it should be understood that the present invention can be embodied in many alternate forms of embodiments. In addition, any suitable size, shape or type of elements or materials could be used.

Figure 2:
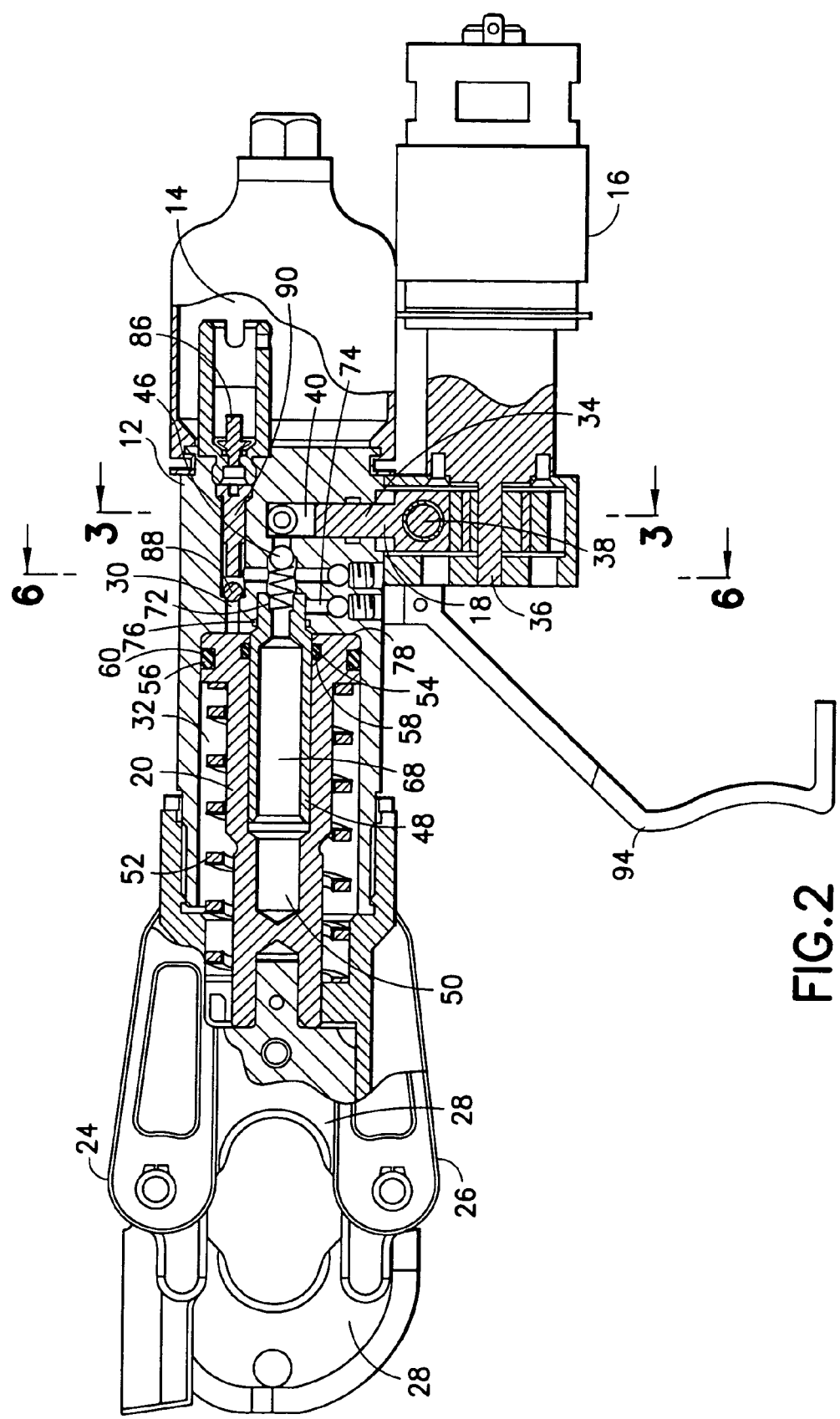
FIG. 2 is a cross sectional view of some of the components of the tool shown in FIG. 1.

The tool 10 comprises a battery operated hydraulic tool. Referring also to FIG. 2, the tool 10 generally comprises a frame 12 surrounded by a housing 13 (see FIG. 1), a hydraulic fluid reservoir 14, an electric motor 16, a hydraulic pump 18, a movable ram 20 and a battery 22. The tool 10 comprises a working head 24 (see FIG. 1). The working head 24 comprises a portion 26 of the frame and the movable ram 20. The portion 26 and the ram 20 are rotatably connected to the rest of the frame 12. In the embodiment shown, the working head 24 comprises a compression or crimping head. The crimping head can compress electrical connectors onto electrical conductors. The crimping head can be adapted to removably received different types of crimping dies 28. In an alternate embodiment, the working head 24 could comprise a cutting head which is adapted to cut electrical conductors or construction rebar, for example. In alternate embodiments, any suitable type of working head having a movable ram could be provided. In addition, features of the present invention could be used in hydraulic tools which are not battery operated, such as a manually actuated hydraulic tool or a hydraulic tool connected to a external hydraulic pump.

Figure 3:
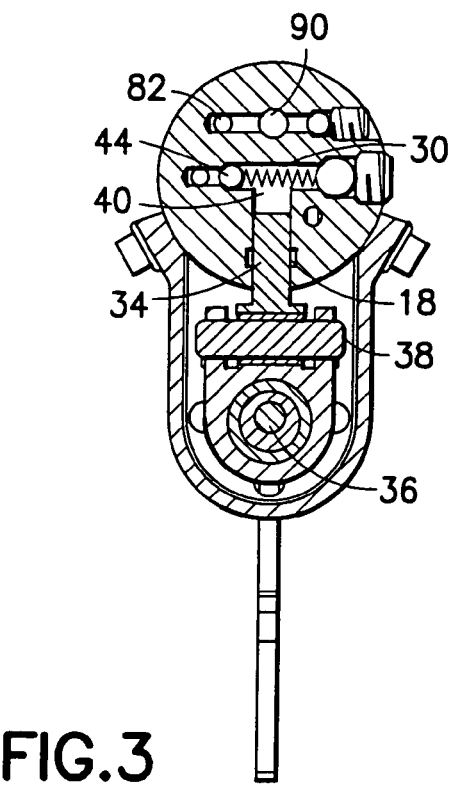
FIG. 3 is a cross sectional view taken along line 3—3 in FIG. 2.

The frame 12 comprises a hydraulic conduit system 30. The hydraulic conduit system 30 is adapted to allow hydraulic fluid to flow between the reservoir 14 and a front area 32 of the frame 12 in which the rear end 78 of the ram is located. The front area 32 has the ram 20 movably located therein. Referring also to FIG. 3, the pump 18 is connected to the frame 12 and comprises a reciprocating piston member 34 located in a portion of the hydraulic conduit system 30. The pump 18 comprises a single stage pump. However, in alternate embodiments, any suitable type of pump could be provided such as, for example, a dual stage pump or a fixed displacement axial piston pump such as shown in U.S. Pat. No. 6,446,482 B1 which is hereby incorporated by reference in its entirety. In the embodiment shown, an output shaft 36 of the electric motor 16 is connected to the piston member 34 by an eccentric transmission system 38 of the pump 18. However, in alternate embodiments, any suitable type of transmission system between the electric motor and the piston member could be provided.

As the output shaft 36 is axially rotated, the eccentric transmission system 38 causes the piston member 34 to move in and out of the piston chamber or pump cavity 40 of the hydraulic conduit system 30. As the piston member 34 is pulled out of the pump cavity 40, hydraulic fluid is drawn from the reservoir 14 into the pump cavity 40. As the piston member 34 is pushed back into the pump cavity 40, hydraulic fluid is pushed out of the pump cavity 40 towards the front area 32 of the frame and, more specifically, towards the rear end 78 of the ram and the conduit 68 of the tube 48.

Figure 4:
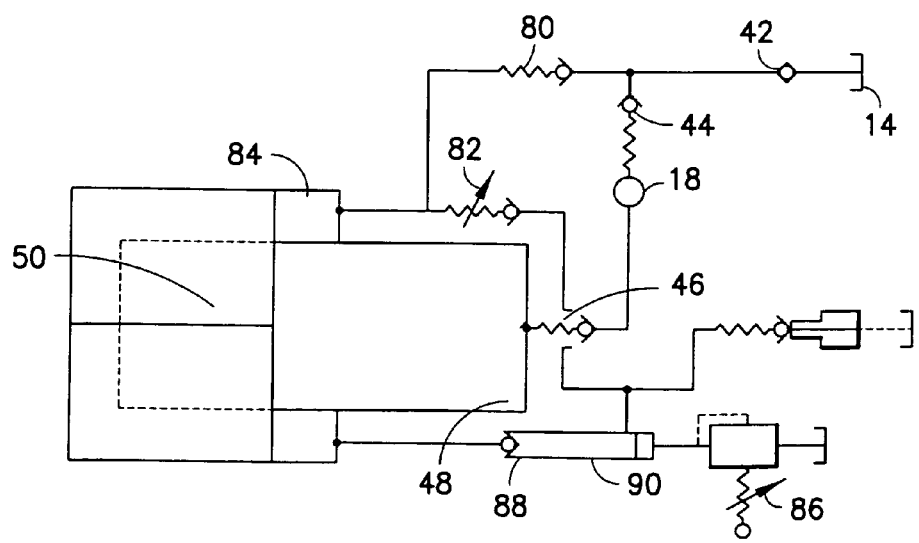
FIG. 4 is a schematic diagram of some of the components and hydraulic system of the tool shown in FIG. 1.

The tool comprises a multi-speed ram advancement system comprising valves in the hydraulic conduit system adapted to initially primarily supply hydraulic fluid from the pump to a chamber inside the ram through the conduit tube, but upon a predetermined hydraulic pressure in the conduit system, to subsequently primarily supply hydraulic fluid from the pump to a rear end of the ram through a path different than through the conduit tube. The hydraulic conduit system 30 comprises various valves located in the conduit system to control where the hydraulic fluid is delivered by the pump 18. The pump operates on an intake stroke and output stroke. Referring also to FIG. 4, during the intake stroke, hydraulic fluid, such as oil, is pulled from the reservoir 14 through a filter 42 and through the inlet check valve 44 filling the pump cavity 40 of the pump 18. Once the pump cavity 40 is filled, the tool is ready for the output stroke. During the output stroke, the hydraulic liquid is pumped across the pump check valve 46, into a conduit tube 48 to fill the center ram cavity 50.

As seen best in FIG. 2, the ram 20 is normally biased in a rearward position by a spring 52. The ram 20 comprises the center ram cavity 50 which extends into the rear end of the ram 20. The cavity 50 forms a hydraulic chamber inside the ram. In addition, the cavity 50 forms a receiving area for slidably receiving a portion of the conduit tube 48. In the embodiment shown, the ram 20 has two annular seal grooves 54, 56. O-ring seals 58, 60 are located in the seal grooves 54, 56.

Figure 5:
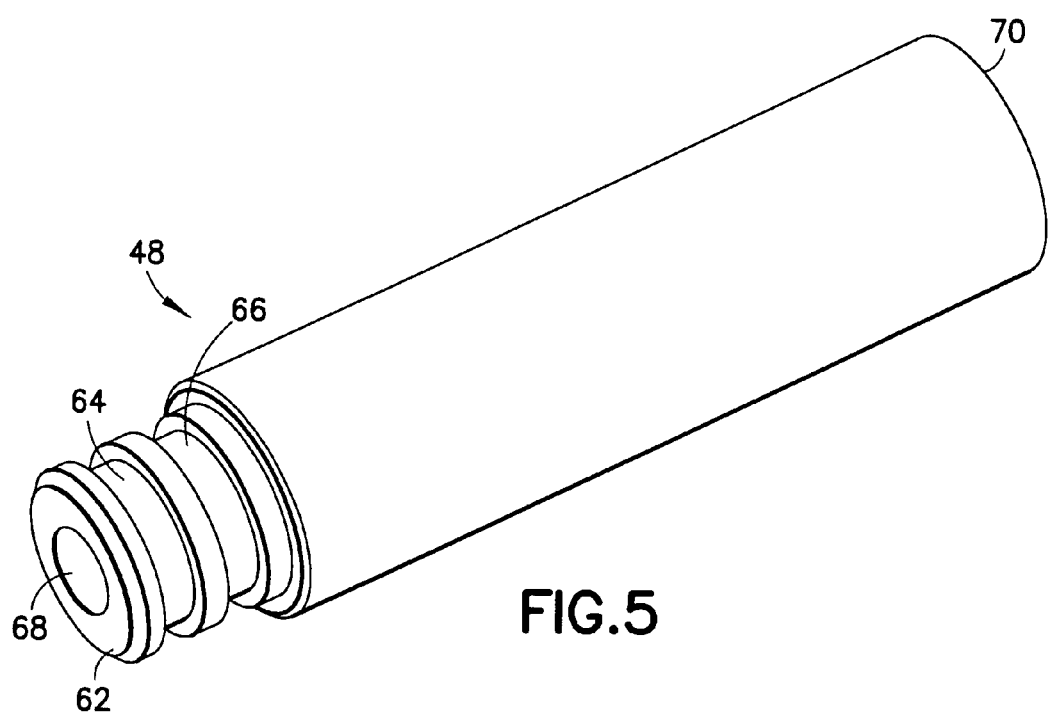
FIG. 5 is a perspective view of the conduit tube shown in FIG. 2.

Referring also to FIG. 5, a perspective view of the conduit tube 48 is shown. The conduit tube comprises a rear end 62 with an exterior surface comprising an annular mounting groove 64 and an annular seal groove 66. The rest of the conduit tube 48 has a general cylindrical shape with a uniform outer lateral side. The conduit tube 48 comprises a conduit 68 which extends from the rear end 62 to the front end 70. The front end of the conduit 68 opens into the center ram cavity 50 of the ram 20 at the front end 70, but is otherwise substantially closed. The rear entrance to the conduit 68 at the rear end 62 of the conduit tube also forms a seat 72 (see FIG. 2) for a spring of the pump check valve 46.

As seen best in FIG. 2, the tool comprises a mounting pin 74 which is connected to the frame 12 and extends from the frame into the annular mounting groove 64 of the conduit tube 48. With this arrangement, the conduit tube 48 is adapted to axially rotate relative to the frame 12. The annular mounting groove 64 is able to rotate relative to the mounting pin 74. Thus, the connection of the rear end of the conduit tube 48 to the frame 12 comprises a rotatable connection. However, because the pin 74 is located in the groove 64, the conduit tube 48 is substantially prevented from longitudinally moving relative to the frame 12. The conduit tube is axially rotatably connected to the frame and longitudinally stationarily fixed to the frame.

The working head 24 can be rotatably connected to the frame 12. The ram 20 can also be rotatably connected to the frame 12. If the ram 20 is rotated, friction between the conduit tube 48 and the ram 20, such as through the seal 58, can be compensated for by the rotatable coupling between the conduit tube 48 and the frame 12 without risk of the conduit tube 48 loosening or becoming disconnected from the frame 12. A first seal 76 is located in the first annular seal groove 66 of the conduit tube. The first seal 76 provides a seal between the conduit tube 48 and the frame 12. The first seal 76 can provide a sealing function even when the conduit tube 48 is axially rotated relative to the frame 12.

An important feature of the present invention is in regard to the assembly of the conduit tube 48 with the frame 12. During assembly of the hydraulic tool 10, the conduit tube 48 can be merely plugged into the frame 12 and the mounting pin 74 connected to the frame 12 to complete attachment of the conduit tube to the frame. Rotational alignment of the conduit tube relative to the frame 12 is not critical. The conduit tube 48 does not need to be rotated at all when being connected to the frame 12. The mounting pin interlocks with the annular groove of the conduit tube regardless of the rotational position of the conduit tube with the frame.

The second seal 58 is located between the ram 20 on the inside surface of the center ram cavity 50 and the exterior surface of the conduit tube 48. The ram 20 is adapted to longitudinally slide on the conduit tube 48. The second seal 58 can provide a sealing function between the center ram cavity 50 and the cavity 84 behind the rear end 78 of the ram 20. The second annular seal groove 54 is located spaced from the rear end 78 of the ram such that the second seal 58 is retained with the ram as the ram moves forward along the conduit tube 48. When compared to a system which has a movable mechanical actuator for a rapid ram advanced system, the conduit tube 48, because it remains longitudinally stationery, can allow for a longer ram stroke movement within a same size longitudinal length of a tool.

Figure 6:
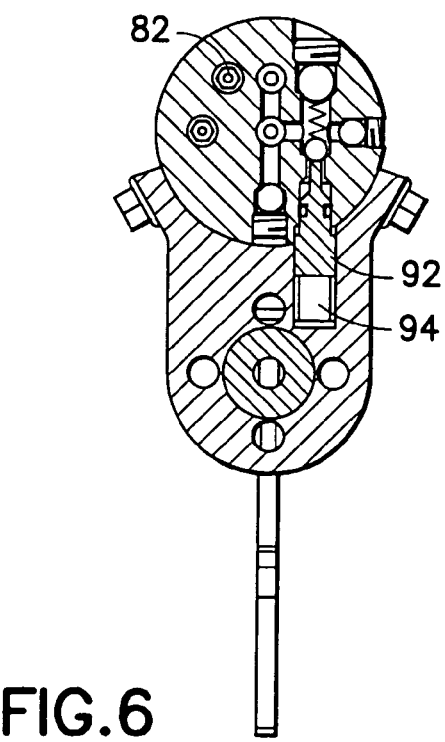
FIG. 6 is a cross sectional view taken along line 6—6 in FIG. 2.
Figure 7:
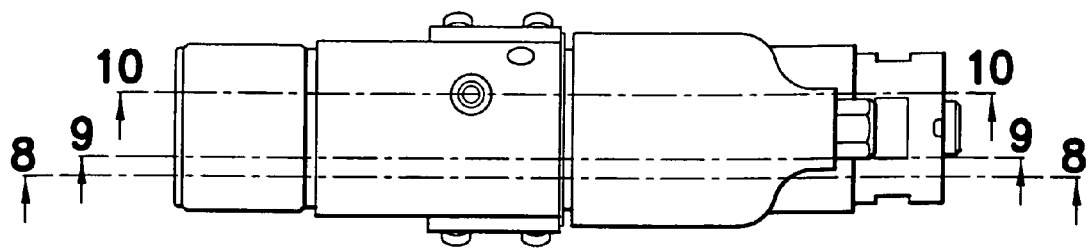
FIG. 7 is a top plan view of some of the components shown in FIG. 2.
Figure 8:
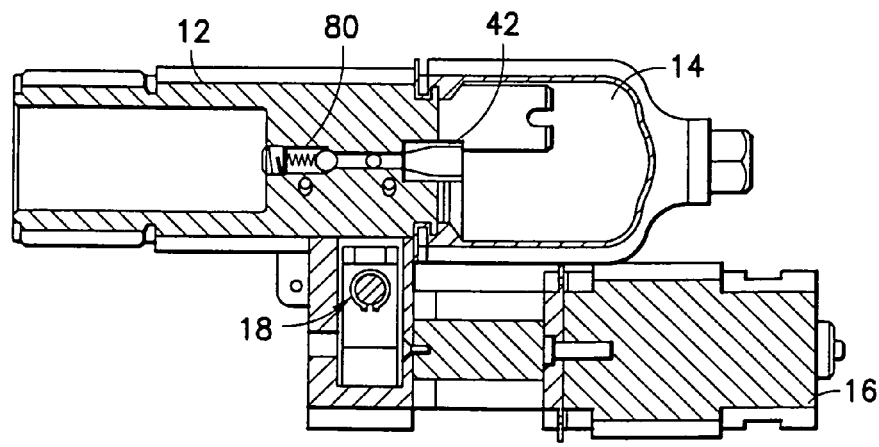
FIG. 8 is a cross sectional view taken along line 8—8 in FIG. 7.
Figure 9:
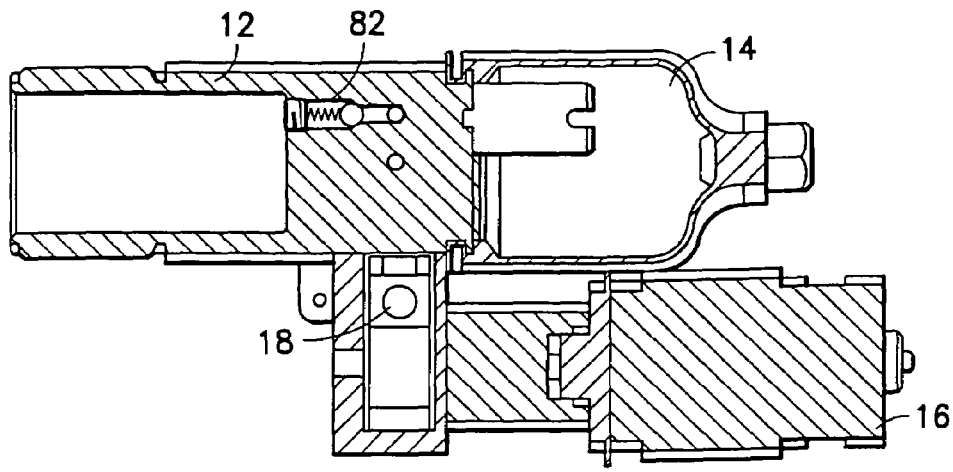
FIG. 9 is a cross sectional view taken along line 9—9 in FIG. 7.
Figure 10:
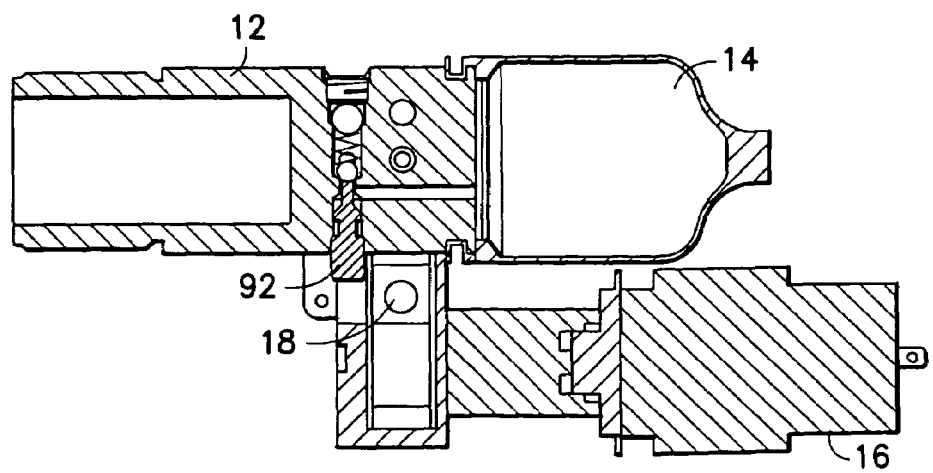
FIG. 10 is a cross sectional view taken along line 10—10 in FIG. 7.

FIG. 7 is a top plan view of the portions of the tool shown in FIG. 2, but without showing the working head. FIGS. 8–10 show various partial cross sections taken from the portions shown in FIG. 7 and FIG. 6 is a cross sectional view taken along line 6—6 in FIG. 2. Referring to FIGS. 2–10, in a preferred embodiment, the pump diameter or diameter of the piston member 34 is relatively close to the diameter of the conduit tube 48. When the hydraulic fluid from the pump enters the center ram cavity 50, because the pump diameter is relatively close to the diameter of the conduit tube 48, the ram 20 is pushed forward relatively quickly. As the ram 20 moves forward, it pulls fluid from the reservoir 14 through filter 42 and a suction check valve 80 (see FIG. 4) behind the rear end 78 by a suction or vacuum effect. When the ram 20 encounters a predetermined resistance, a low pressure check valve 82 opens and allows the hydraulic fluid to flow into the cavity 84. Once the pressure in the cavity 84 starts to increase, the suction check valve 80 is forced closed.

As the tool continues to operate through a number of intake and output strokes of the pump, pressure increases to a predetermined set point, such as 8500–10,000 psi, for example. Once the set point pressure is obtained, the pressure relief valve 86 and the check valve 88 open. This allows hydraulic fluid to drain back around the lift stop valve 90 and into the reservoir 14. Oil drains back until the pressure relief valve 86 closes. In a preferred embodiment, the pressure relief valve closes or reseats at approximately 2000 psi. Oil, or hydraulic liquid, from the center ram cavity 50 and cavity 84 must be drained mechanically through manual valve 92. To drain the oil, the manual valve 92 is depressed when lever 94 is moved by a user. The ram 20 is moved back to its retracted position by the spring 52.

Some of the advantages of the present invention are similar to those of a mechanical actuator. They both offer speed, reliability and ease of manufacturing. However, with the mechanical actuator, it is most difficult to package for crimped and cutting tools that require additional range capabilities, such as ram travel of approximately 1.4 inches or more, especially in a relatively low output force tool, such as a four to nine U.S. short tons of crimp or cut force. This is a result of several factors. Factors include the manufacturing of long mechanical actuators and cylinders to accommodate such actuators. Long bores are difficult to produce in small diameters. In addition, packaging the mechanical actuator into a small diameter ram requires a small diameter mechanical actuator. A small diameter mechanical actuator in a battery tool may become too fast and safety needs to be considered.

Referring now to FIGS. 1 and 11–13, the lever 94 forms a trigger guard for the activation trigger 96. To activate the tool 10, a user must depress the activation trigger 96. With the activation trigger 96 depressed, the ram will move forward to cut or crimp an article in the working head. Once the crimp or cut is complete, the ram is retracted to its home position prior to starting the next crimp or cut cycle. In the prior art, an activation trigger was susceptible to unwanted activation. If the activation device is accidentally bumped, the tool can start to run. To safeguard against unwanted activation, manufacturers use trigger guards. Such trigger guards require additional components to assemble, manufacture, inventory, and may increase the physical size of the tool. In addition, they add cost and weight to the tool. To return the ram to the home position, the user will manually press a separate release mechanism. When the release mechanism is depressed, the ram will move towards a retracted position.

The present invention combines the features of a trigger guard with a release mechanism. More specifically, the member 94 is part of a multi-function mechanism forming both a trigger guard for the activation trigger 96 and a lever for the hydraulic fluid release mechanism. The lever 94 can be pressed to return the ram to its home position prior to the next crimp/cut cycle. In addition, the member 94 is used as a trigger guard for protecting the activation trigger 96 from unwanted activation. In the event the lever 94 is accidentally pressed or bumped, the lever 94 can prevent the force from actuating the activation trigger 96.

Figure 11:
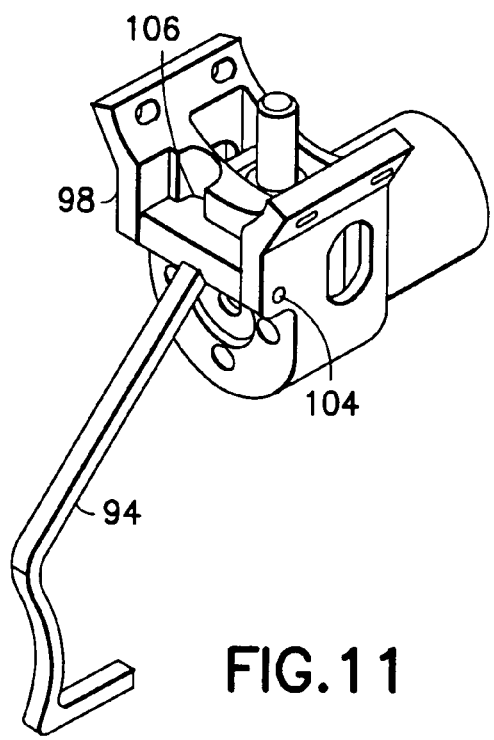
FIG. 11 is a perspective view of some of the components of the tool shown in FIGS. 1 and 2.
Figure 12:
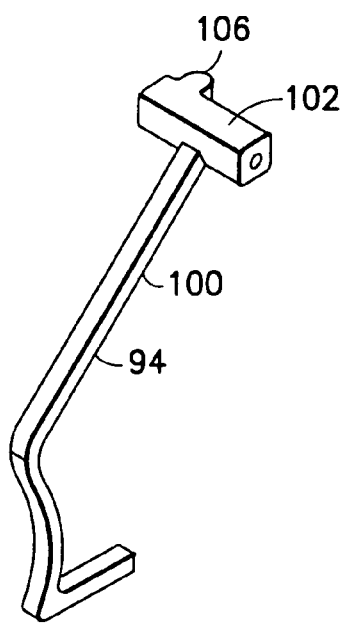
FIG. 12 is a perspective view of the trigger guard shown in FIG. 11.
Figure 13:
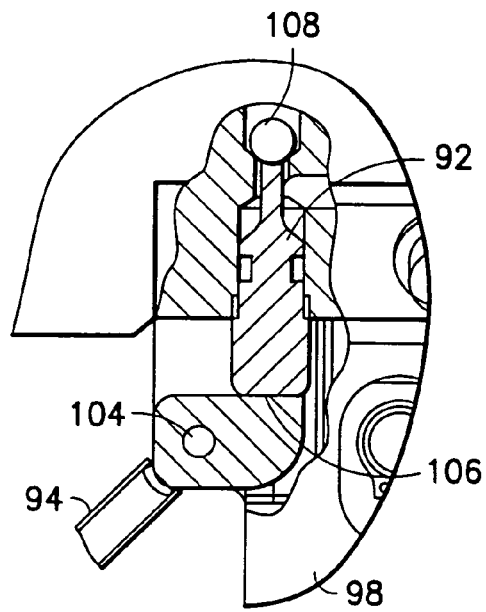
FIG. 13 is a partial cut-away view of components of the release system.

If the user accidentally presses or bumps both the member 94 and the activation trigger 96, such as when a user's finger is on the activation trigger 96 and the member 94 is accidentally bumped or pressed, the ram of the tool will not advance. It will remain at rest as long as the member 94 is pressed. As seen in FIG. 11, the member 94 is preferably a one-piece member and is connected to a transfer case or portion 98 of the frame. The portion 98 forms part of the pump housing and transmission housing for transferring work from the electric motor to the pump. As seen in FIG. 12, the member 94 has a first section 100 and a second section 102. The second section 102 is pivotably attached to the portion 98 by a pin 104. The second section 102 has an extension 106. As seen in FIG. 13, the bottom of the manual valve 92 is located on top of the extension 106. The member 94 is able to pivot or rotate about the pin 104 and rest against the manual valve or striker 92. When the member 94 is depressed the extension 106 presses the striker 92 upward to open the check valve 108 of the manual valve 92. This allows hydraulic fluid to flow back to the oil reservoir. Thus, the ram is able to be pushed back to its home position by the spring 52 (see FIG. 2). When the user releases the member 94, the spring of the check valve 108 can push the striker 92 back down and the member 94 can be returned to its original home position. With the present invention, the release mechanism is integrated with the trigger guard feature to reduce the number of parts of the tool and thereby reduce the manufacturing cost and assembly time. The weight and size of the tool is also reduced.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A hydraulic tool comprising:
   a frame having a hydraulic conduit system;
   a ram movably connected to the frame;
   a ram advancement system for advancing the ram on the frame, the ram advancement system comprising an activation member; and
   a combined activation member guard and hydraulic fluid release system comprising a valve and a guard member located a spaced distance in front of the activation member, wherein the guard member forms a guard located in front of the activation member for protecting the activation member from inadvertent movement, wherein the guard member is adapted to actuate the valve, wherein the guard member is movably connected to the frame, and wherein the valve comprises a spring to bias the guard member at a home position.

2. A hydraulic tool as in claim 1 wherein the guard member is pivotably mounted to the frame.

3. A hydraulic tool as in claim 2 wherein the guard member is adapted to be pivoted from a home position to a rear valve actuated position.

4. A hydraulic tool as in claim 1 wherein guard member comprises a first section adapted to be contacted by a user's finger and a second section, wherein the second section is movably connected to the frame, wherein the guard member comprises an extension extending from the second section, and wherein the extension contacts the valve for opening the valve when the first section is moved.

5. A hydraulic tool comprising:
   a frame having a hydraulic conduit system;
   a ram movably connected to the frame;
   a ram advancement system comprising the hydraulic conduit system for advancing the ram on the frame, the ram advancement system comprising an activation trigger; and
   a combined activation trigger guard and hydraulic fluid release system comprising a valve and a guard member located a spaced distance from the activation trigger, wherein the guard member forms a trigger guard for protecting the activation trigger from inadvertent movement, wherein the guard member is adapted to actuate the valve, and wherein the guard member is pivotably mounted to the frame.

6. A hydraulic tool as in claim 5 wherein the guard member is adapted to be pivoted from a home position to a rear valve actuated position.

7. A hydraulic tool as in claim 5 wherein guard member comprises a first section adapted to be contacted by a user's finger and a second section, wherein the second section is movably connected to the frame, wherein the guard member comprises an extension extending from the second section, and wherein the extension contacts the valve for opening the valve when the first section is moved.

8. A hydraulic tool as in claim 5 wherein the guard member is movably connected to the frame, and wherein the valve comprises a spring to bias the guard member at a home position.

9. A method of assembling a hydraulic tool comprising:
   connecting a hydraulic fluid release valve to a hydraulic conduit system in a frame of the hydraulic tool;
   connecting a hydraulic pump to the frame and the hydraulic conduit system;
   connecting an activation trigger to the frame;
   connecting a trigger guard to the frame in front of the activation trigger, wherein a portion of the trigger guard is coupled to the release valve to actuate the release valve when the trigger guard is moved relative to the frame, wherein the trigger guard is at least partial biased towards a home position by a spring of the release valve.

* * * * *